United States Patent
Gardes et al.

(10) Patent No.: US 11,136,938 B2
(45) Date of Patent: Oct. 5, 2021

(54) BYPASS TURBOFAN ENGINE COMPRISING A NACELLE EQUIPPED WITH A TRANSLATIONALLY-MOBILE THRUST-REVERSAL SYSTEM AND WITH A FAN CASE EQUIPPED WITH SUPPORTS

(71) Applicant: Airbus Operations SAS, Toulouse (FR)

(72) Inventors: Pascal Gardes, Levignac (FR); Frédéric Ridray, L'Isle Jourdain (FR); José Goncalves, Colomiers (FR)

(73) Assignee: AIRBUS OPERATIONS SAS, Toulouse (FR)

(*) Notice: Subject to any disclaimer, the term of this patent is extended or adjusted under 35 U.S.C. 154(b) by 88 days.

(21) Appl. No.: 16/656,632

(22) Filed: Oct. 18, 2019

(65) Prior Publication Data

US 2020/0122409 A1  Apr. 23, 2020

(30) Foreign Application Priority Data

Oct. 22, 2018 (FR) ...................................... 1871256

(51) Int. Cl.
*F02K 1/72* (2006.01)
*B29C 65/70* (2006.01)
(Continued)

(52) U.S. Cl.
CPC ................ *F02K 1/72* (2013.01); *B29C 65/70* (2013.01); *B29C 65/7841* (2013.01);
(Continued)

(58) Field of Classification Search
CPC ..... F02K 1/72; F02K 1/54; F02K 1/68; F02K 1/08
See application file for complete search history.

(56) References Cited

U.S. PATENT DOCUMENTS

| 4,922,713 A | 5/1990 | Barbarin et al. |
| 10,690,088 B2* | 6/2020 | Ridray ..................... F02K 1/72 |

(Continued)

FOREIGN PATENT DOCUMENTS

| EP | 0315524 A1 | 5/1989 |
| EP | 1878904 A2 | 1/2008 |
| FR | 2929655 A1 | 10/2009 |

OTHER PUBLICATIONS

French Search Report; priority document.

*Primary Examiner* — Craig Kim
(74) *Attorney, Agent, or Firm* — Greer, Burns & Crain, Ltd.

(57) ABSTRACT

A bypass turbofan engine with a nacelle comprising a fan case and a thrust-reversal system. The fan case comprises an exterior wall, and the reversal system comprises a slider having an upstream frame, a downstream frame and a plurality of spars fixed between the upstream frame and the downstream frame, in which the slider is able to move between a forward position and a retracted position. The fan case comprises, at a rear edge of its exterior wall, a support. Each support comprises, for each spar, a shoe fixed to the exterior wall and positioned radially about the spar, and a skirt secured to the shoes and extending the rear edge, in which, in a forward position, the skirt bears around the downstream frame, and in which in a forward/retracted/intermediate position, the shoes are distant from the spars from the upstream frame.

4 Claims, 3 Drawing Sheets

(51) Int. Cl.
  *B29C 65/78*  (2006.01)
  *B29C 65/00*  (2006.01)
  *B29C 65/48*  (2006.01)
  *B29L 31/30*  (2006.01)
  *F02K 1/54*  (2006.01)
  *F02K 1/68*  (2006.01)

(52) U.S. Cl.
  CPC .. *B29C 66/00145* (2013.01); *B29C 66/12261* (2013.01); *B29C 65/48* (2013.01); *B29L 2031/3076* (2013.01); *F02K 1/54* (2013.01); *F02K 1/68* (2013.01)

(56) References Cited

U.S. PATENT DOCUMENTS

| | | | |
|---|---|---|---|
| 10,995,700 B2* | 5/2021 | Ridray | B64D 33/04 |
| 2008/0010969 A1 | 1/2008 | Hauer et al. | |
| 2009/0151320 A1* | 6/2009 | Sternberger | F02K 1/72 60/226.2 |
| 2010/0064659 A1* | 3/2010 | Wang | F02K 1/763 60/226.2 |
| 2011/0023450 A1* | 2/2011 | Stuart | F02K 1/72 60/226.2 |
| 2012/0067024 A1* | 3/2012 | Vauchel | F02K 1/72 60/226.2 |
| 2014/0116026 A1* | 5/2014 | Todorovic | F02K 1/72 60/226.2 |
| 2014/0319243 A1 | 10/2014 | Caruel et al. | |
| 2014/0325957 A1* | 11/2014 | Aten | F02K 1/72 60/226.2 |
| 2015/0308376 A1* | 10/2015 | James | B64D 29/00 239/265.19 |
| 2015/0308380 A1* | 10/2015 | Biset | F02K 1/32 60/226.2 |
| 2016/0169157 A1* | 6/2016 | Sawyers-Abbott | F02K 1/72 239/1 |
| 2016/0273487 A1* | 9/2016 | Vauchel | F02K 1/805 |
| 2017/0107943 A1* | 4/2017 | Franer | F02K 1/763 |
| 2018/0274484 A1 | 9/2018 | Ridray et al. | |

* cited by examiner

BYPASS TURBOFAN ENGINE COMPRISING A NACELLE EQUIPPED WITH A TRANSLATIONALLY-MOBILE THRUST-REVERSAL SYSTEM AND WITH A FAN CASE EQUIPPED WITH SUPPORTS

CROSS-REFERENCES TO RELATED APPLICATIONS

This application claims the benefit of the French patent application No. 1871256 filed on Oct. 22, 2018, the entire disclosures of which are incorporated herein by way of reference.

FIELD OF THE INVENTION

The present invention relates to a bypass turbofan engine which comprises a nacelle equipped with a thrust reversal system which is translationally mobile and with a fan case which comprises supports bearing against the thrust-reversal system, and to an aircraft comprising at least one such bypass turbofan engine.

BACKGROUND OF THE INVENTION

An aircraft comprises a fuselage, to each side of which a wing is fixed. Suspended under each wing is at least one bypass turbofan engine. Each bypass turbofan engine is fixed under the wing via a pylon which is fixed between the structure of the wing and the structure of the bypass turbofan engine.

The bypass turbofan engine comprises an engine and a nacelle which is fixed around the engine.

The nacelle comprises a fixed structure to which there are fixed, from front to rear, a cowl delimiting an air inlet, a fan case and a thrust-reversal system.

The thrust-reversal system comprises a slider capable of translational movement on the fixed structure and a mobile cowl fixed to and downstream of the slider.

The slider retracts to move the mobile cowl away from the fan case in order to leave a free passage between a flow path in which a bypass flow circulates and the outside. To this end, the slider is perforated and bears reverser flaps in which each is able to move between a storage position in which it does not interact with the bypass flow, and a deployed position in which it positions itself across the bypass flow to deflect it towards the outside when the mobile part is retracted.

In such a nacelle of the prior art, the rear edge of the fan case is fixed to the fixed structure which holds it in position, whether the slider be forward or retracted.

For weight saving, it desirable to reduce the dimensions of the fixed structure, particularly at the rear edge of the fan case, while at the same time ensuring that the rear edge remains supported.

SUMMARY OF THE INVENTION

One object of the present invention is to propose a bypass turbofan engine which comprises a nacelle equipped with a thrust reversal system which is translationally mobile and with a fan case which comprises supports that do not press on the thrust reversal system.

To this end, there is proposed, a bypass turbofan engine with a longitudinal axis and comprising an engine and a nacelle surrounding the engine, the nacelle comprising a fixed structure, a fan case and a thrust reversal system, in which the fan case comprises, fixed to the fixed structure, an interior wall with which the engine delimits a flow path for a bypass flow, and an exterior wall, in which the thrust reversal system comprises:
 a slider mounted with translational mobility on the fixed structure and having an upstream frame, a downstream frame and a plurality of spars parallel to the longitudinal axis, in which each one is fixed by a first end to the upstream frame and by a second end to the downstream frame, and
 a mobile cowl fixed to and downstream of the downstream frame and having an interior wall which with the engine delimits the flow path, and an exterior wall,
in which the slider is able to move between forward position in which the slider is housed between the exterior wall of the fan case and the interior wall of the fan case and is positioned in such a way that the mobile cowl is up close to the fan case and a retracted position in which the main slider is positioned in such a way that the mobile cowl is distanced from the fan case in order to define between them apertures that are open between the flow path and the outside of the nacelle,
in which the fan case comprises, at a rear edge of its exterior wall, a support comprising, on the one hand, for each spar, a shoe fixed to the inside of the exterior wall facing the spar and positioned radially around the spar and, on the other hand, a skirt secured to the shoes and extending the rear edge of the exterior wall of the fan case, and
in which, in the forward position, the skirt bears around the downstream frame and the shoes are at a distance from the spars, in which in the retracted position, the shoes face and are distant from the upstream frame, and in which in an intermediate position between the forward position and the retracted position, the shoes face and are at some distance from the spars.

Such a turbofan engine thus makes it possible to reduce the dimensions of the fixed structure, while at the same time ensuring that the rear edge of the fan case is held in position whatever the position of the thrust reversal system.

Advantageously, the distance "d1" between each shoe and the corresponding spar is comprised between 3 mm and 5 mm, and the distance "d2" between each shoe and the upstream frame is comprised between 0 and 3 mm.

Advantageously, the downstream frame bears a seal on its exterior periphery, and the skirt comes into contact with the seal in the forward position.

The present invention also proposes an aircraft comprising at least one bypass turbofan engine according to one of the preceding alternative forms.

BRIEF DESCRIPTION OF THE DRAWINGS

The abovementioned features of the invention, together with others, will become more clearly apparent from reading the following description of one exemplary embodiment, the description being given with reference to the attached drawings, which.

DETAILED DESCRIPTION OF THE PREFERRED EMBODIMENTS

Figure 1:
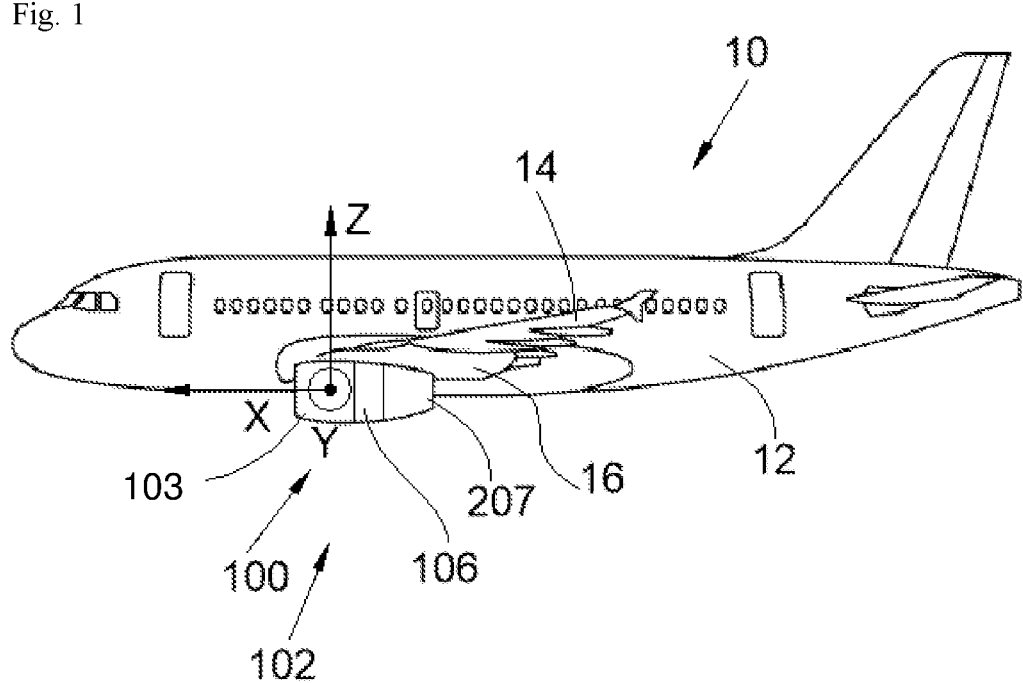
FIG. 1 is a side view of an aircraft comprising a turbofan engine according to the invention.

In the description which follows, terms relating to a position are considered with reference to an aircraft in the position of forward travel as depicted in FIG. 1.

FIG. 1 shows an aircraft 10 which comprises a fuselage 12, to each side of which is fixed a wing 14 which bears at least one bypass turbofan engine 100 according to the invention. The bypass turbofan engine 100 is fixed beneath the wing 14 by means of a pylon 16.

The bypass turbofan engine 100 has a nacelle 102 and an engine (20, FIG. 2) which is housed inside the nacelle 102.

In the description which follows, and by convention, the longitudinal axis of the bypass turbofan engine 100 which is parallel to the longitudinal axis of the aircraft 10 oriented positively in the direction of forward travel of the aircraft 10 is referred to as X, the transverse axis of the aircraft which is horizontal when the aircraft is on the ground is referred to as Y, and the axis that is vertical when the aircraft is on the ground is referred to as Z, these three directions X, Y and Z being mutually orthogonal.

Figure 2:
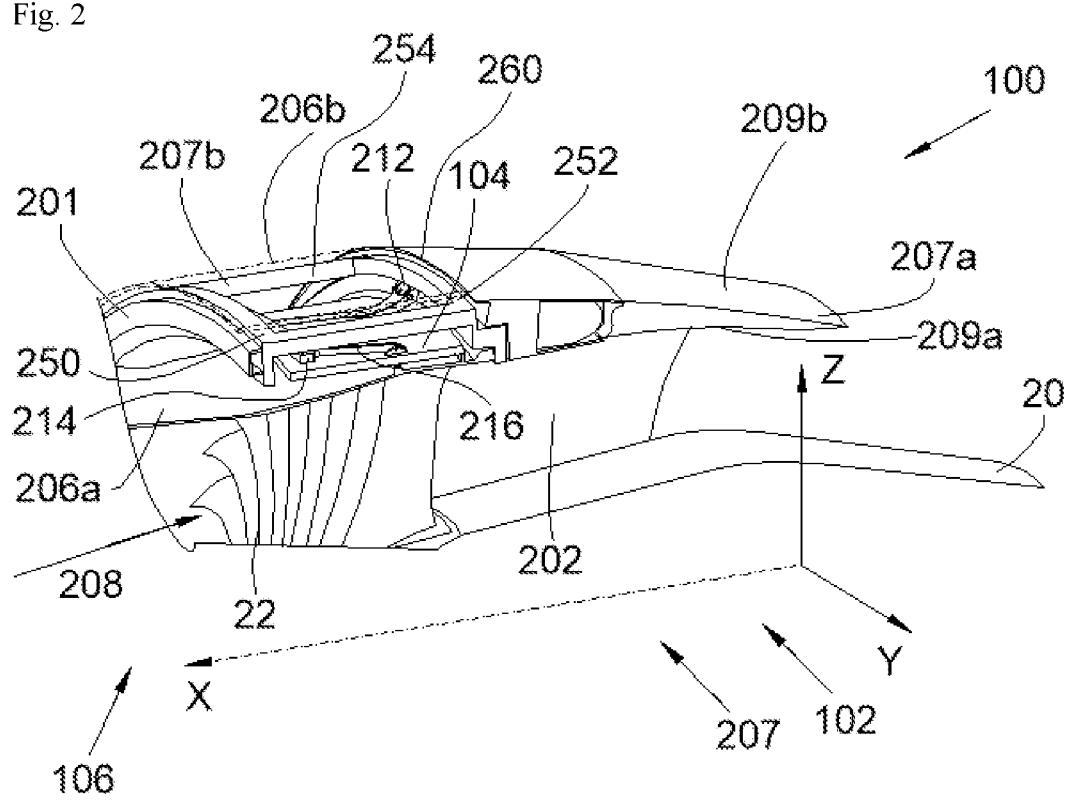
FIG. 2 is a perspective view of a cross section through the turbojet engine according to the invention in the forward position.
Figure 3:
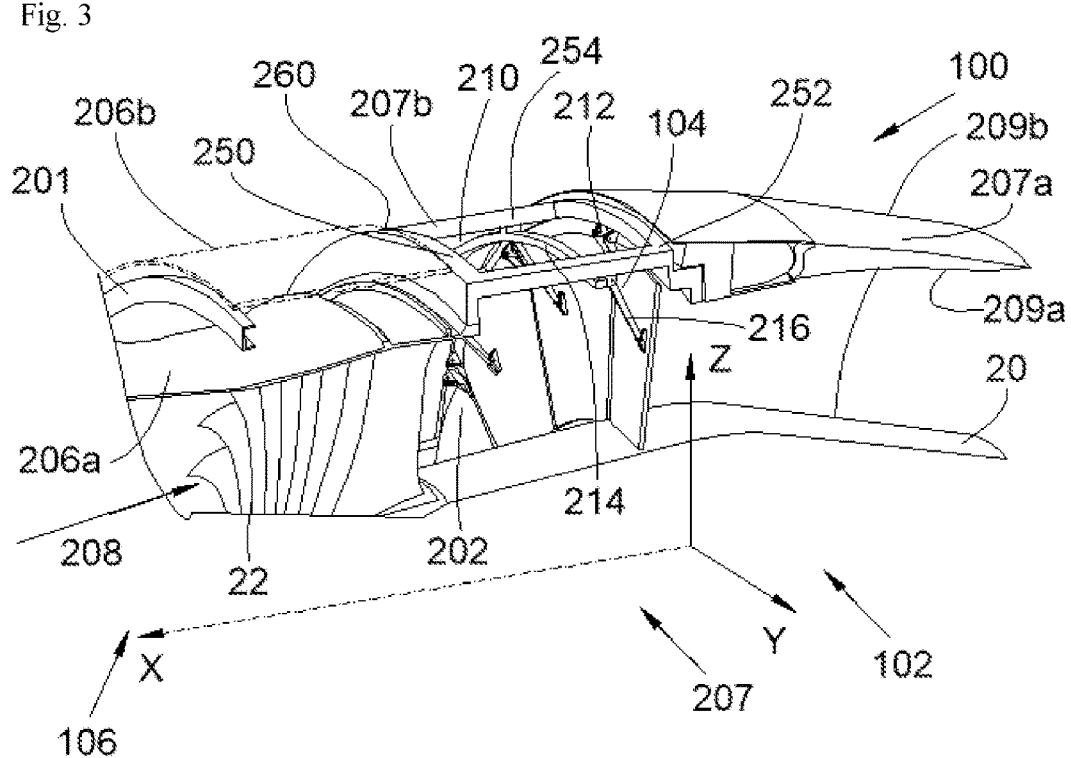
FIG. 3 is a perspective view of a cross section of the turbojet engine of FIG. 2 in the retracted position.

FIG. 2 and FIG. 3 show cross sections through the bypass turbofan engine 100. The nacelle 102 comprises a fixed structure 201 which here takes the form of a front frame.

The engine 20 is embodied here by its nose cone and its fan 22 inside the air intake of the nacelle 102. As shown in FIGS. 2 and 3, the bypass turbofan engine 100 has, between the nacelle 102 and the engine 20, a flow path 202 in which the bypass flow 208 coming from the air intake through the fan 22 circulates.

The nacelle 102 comprises, fixed to the fixed structure 201, from front to rear, a cowl 103 delimiting the air intake, a fan case 106 and a thrust reversal system 207.

The fan case 106 comprises, fixed to the fixed structure 201, an interior wall 206a around the engine 20 and which delimits the exterior surface of the flow path 202, and an exterior wall 206b which constitutes the external fairing of the nacelle 102. In FIGS. 2 and 3, the exterior wall 206b is viewed in transparency (fine chain line).

The thrust reversal system 207 comprises a slider 207b which is mounted with translational mobility on the fixed structure 201, and a mobile cowl 207a forming the walls of a jet pipe and fixed to and around the slider 207b.

The mobile cowl 207a has an interior wall 209a around the engine 20 and which delimits the exterior surface of the flow path 202 and an exterior wall 209b which constitutes the external fairing of the nacelle 102.

The slider 207b is thus translationally mobile in a direction of translational movement parallel overall to the longitudinal axis X between a forward position (FIG. 2) and a retracted position (FIG. 3) and vice versa. In the forward position, the slider 207b is positioned as far forward as possible so that the mobile cowl 207a is up close to the fan case 106. In the retracted position, the slider 207b is positioned as far back as possible so that the mobile cowl 207a is distanced from the fan case 106 in order to open apertures 210 between the flow path 202 and the outside of the nacelle 102.

In the forward position, the interior wall 209a of the mobile cowl 207a and the interior wall 206a of the fan case 106 extend in the continuation of one another to define the exterior surface of the flow path 202. Likewise, in the forward position, the exterior wall 209b of the mobile cowl 207a and the exterior wall 206b of the fan case 106 extend in the continuation of one another in order to define the external fairing of the nacelle 102.

What that means to say is that the front edge of the exterior wall 209b of the mobile cowl 207a which faces towards the front of the nacelle 102 comes as close as possible to the rear edge 260 of the exterior wall 206b of the fan case 106 which faces towards the rear of the nacelle 102.

In the retracted position, the mobile cowl 207a and the fan case 106 are distanced from one another and between them define apertures 210 (FIG. 6) which are open between the flow path 202 and the outside of the nacelle 102. This means to say that air from the bypass stream 208 passes through the apertures 210 to reach the outside of the bypass turbofan engine 100.

In the forward position, the slider 207b is housed between the exterior wall 206b of the fan case 106 and the interior wall 206a of the fan case 106.

Figure 4:
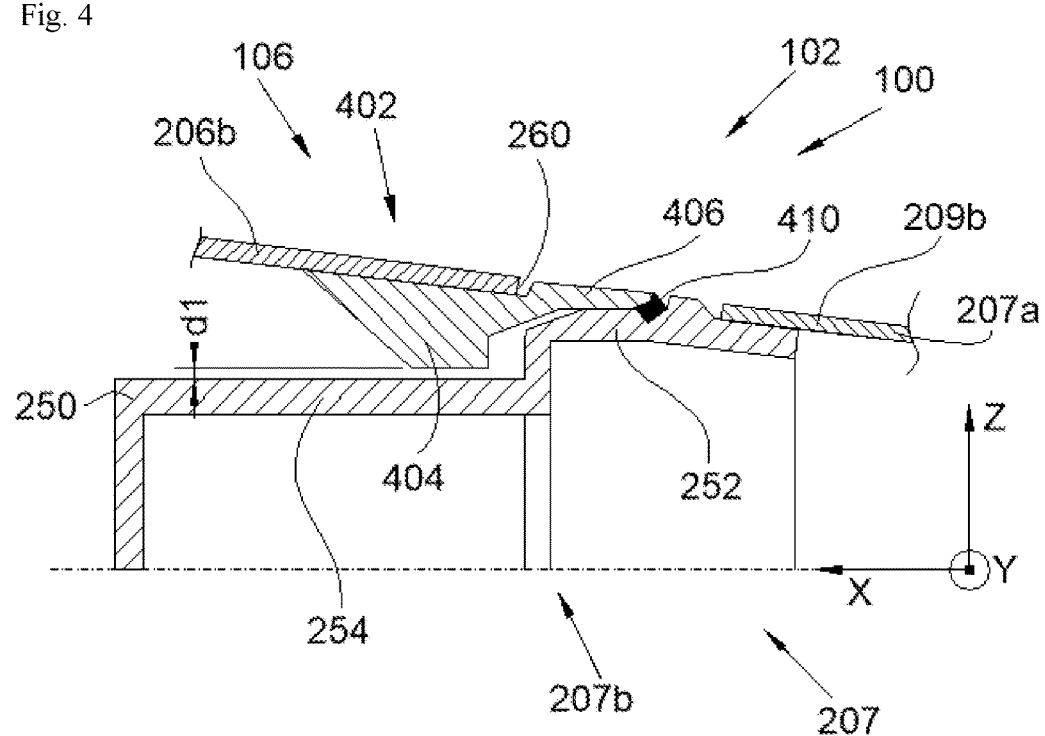
FIG. 4 is a side view in cross section of a nacelle according to the invention in the forward position, FIG. 5 corresponds to FIG. 4 for an intermediate position, and FIG. 6 corresponds to FIG. 4 for a retracted position.

As is shown in FIG. 4, the exterior wall 209b of the mobile cowl 207a and the exterior wall 206b of the fan case 106 do not directly extend in the continuation of one another in the forward position because of the presence of a support 402 which comes to bear around the downstream frame 252 and which becomes interposed between the front edge of the exterior wall 209b of the mobile cowl 207a and the rear edge 260 of the exterior wall 206b of the fan case 106.

In order to deflect the bypass stream 208 from the flow path 202 outwards, the slider 207b bears deflection means 104 which here comprise doors 104 but which could also or alternatively comprise cascades.

The slider 207b adopts the form of a cylinder with perforated walls and has an upstream frame 250 oriented towards the front and a downstream frame 252 oriented towards the rear. The upstream frame 250 and the downstream frame 252 adopt the overall shape of a ring around the flow path 202. The mobile cowl 207a is fixed to and downstream of the downstream frame 252.

The slider 207b also comprises a plurality of spars 254 which are parallel to the longitudinal axis X, in which each is fixed by a first end to the upstream frame 250 and by a downstream end to the downstream frame 252. There are a plurality of spars 254 distributed around the peripheral of the nacelle 102 in order to afford the slider 207b rigidity.

Each aperture 210 is delimited between two successive spars 254 and between the upstream frame 250 and the downstream frame 252.

The translational movement of the slider 207b is achieved by any appropriate guideway system between the fixed structure 201 and the slider 207b. The movement of the slider 207b is brought about by any suitable movement means, such as jacks, for example.

In the invention embodiment depicted in FIGS. 2 and 3, the nacelle 102 comprises a plurality of doors 104 distributed on the peripheral of the nacelle 102 and each is mounted in an articulated manner on the slider 207b to articulate between a closed position (FIG. 2) and an open position (FIG. 3) and vice versa.

The closed position may be adopted when the slider 207b is in the forward position or in the retracted position. The open position can be adopted only when the slider 207b is in the retracted position.

In the closed position, each door 104 closes off an aperture 210, and in the open position, the door 104 does not close off the aperture 210, allowing the bypass stream 208 to pass.

Thus, in the closed position, each door 104 is roughly in the continuation of the mobile cowl 207a and, in the open position, each door 104 is positioned across the flow path 202 and deflects at least part of the bypass flow 208 towards the outside through the aperture 210.

In the forward position, each door 104 also positions itself between the exterior wall 206b of the fan case 106 and the interior wall 206a of the fan case 106.

Each door 104 here is articulated to the downstream frame 252 on hinges 212 whereas the opposite free edge positions itself towards the upstream direction in the closed position and towards the engine 20 in the open position.

In the invention embodiment depicted here, the mobile assembly 207 also has a secondary slider 214 which is mounted with translational mobility in a direction parallel to the direction of translation on the slider 207b. The secondary slider 214 is thus able to move between a first position and a second position.

The mobile assembly 207 also has a transmission system 216 which, for each door 104, here takes the form of a linkage articulated via one end to the door 104 and articulated via another end to the secondary slider 214.

The transmission system 216 is intended to cause each door 104 to pass from the closed position into the open position when the secondary slider 214 passes from first position to the second position and vice versa.

In the invention embodiment depicted here, the first position comprises moving the secondary slider 214 forward whereas the second position comprises moving the secondary slider 214 backwards.

The translational movement of the secondary slider 214 is brought about by any suitable guideway systems between the slider 207b and the secondary slider 214. The movement of the secondary slider 214 is brought about by any suitable movement means such as, for example, jacks.

As specified above, the doors 104 may be replaced or supplemented by cascades. Equally, the way in which the doors 104 are embodied can be different.

Figure 5:
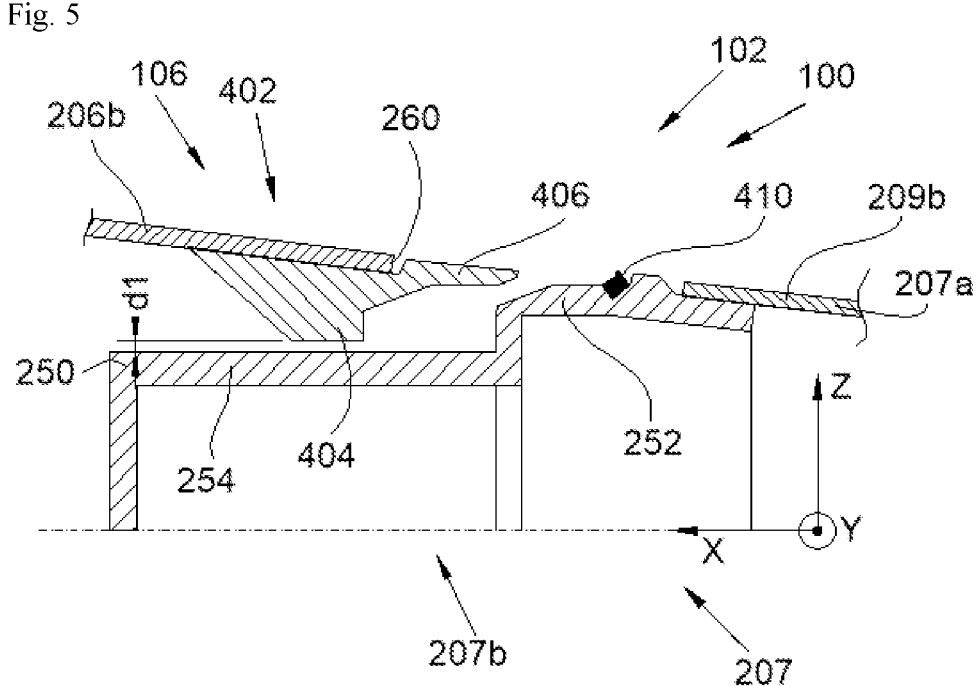
Figure 6:
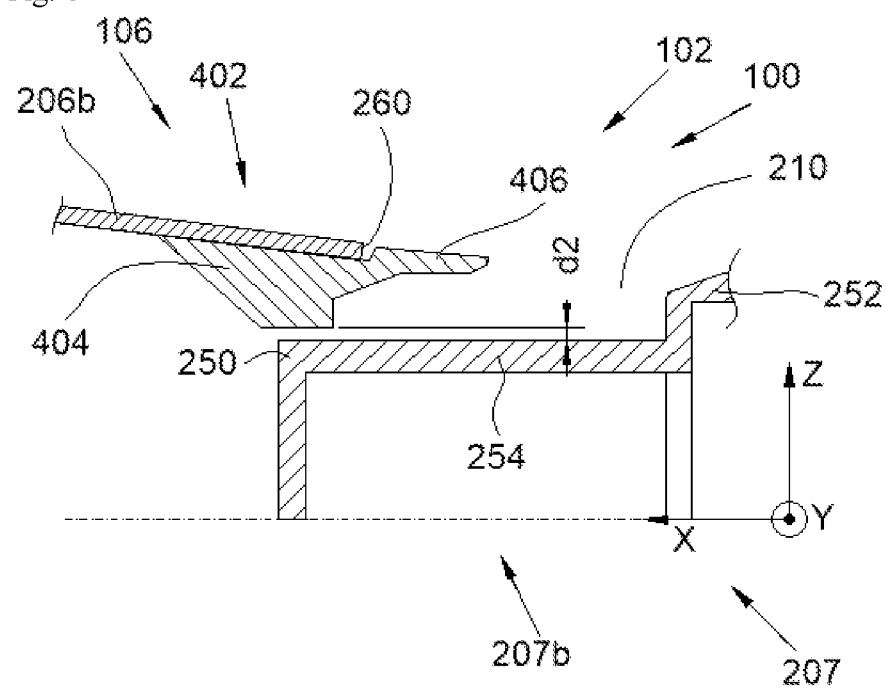

FIGS. 4 to 6 show the fan case 106 and the slider 207b in the forward position (FIG. 4), in the retracted position (FIG. 6) and in an intermediate position (FIG. 5) somewhere between the forward position and the retracted position.

The fan case 106 comprises, at the rear edge 260 on its exterior wall 206b, a support 402.

For each spar 254, the support 402 comprises a shoe 404 fixed on the inside of the exterior wall 206b facing the spar 254 and positioned radially about the spar 254.

The support 402 also comprises a skirt 406 which takes the form of an arc of a cylinder which extends the rear edge 260 of the exterior wall 206b of the fan case 106. The skirt 406 extends beyond the rear edge 260 of the exterior wall 206b of the fan case 106 and around the downstream frame 252 in the forward position.

The skirt 406 is attached to the shoes 404.

In the forward position, the skirt 406 comes to bear around the downstream frame 252 to ensure the aerodynamic continuity of the nacelle 102 and extends the exterior wall 209b of the mobile cowl 207a.

In the forward position, the shoes 404 are distant from the spars 254.

In the retracted position, the shoes 404 face and are at some distance from the upstream frame 250 and the skirt 406 is no longer supported by the downstream frame 252.

Likewise, in the intermediate position, the shoes 404 face and are some distance from the spars 254 and the skirt 406 is no longer supported by the downstream frame 252.

The distances between the shoes 404 and the spars 254, on the one hand, and, on the other hand, between the shoes and the upstream frame 250, are such that if the fan case 106 deforms, at least one of the shoes 404 comes to bear against a beam 254 or the upstream frame 250 so as to limit the deformation of the fan case 106. In other words, the distances are defined by the maximum forces that the spars 254 are able to withstand during the deployment phase according to the maximum deformation of the exterior wall 206b and according to the maximum ability of the mobile cowl to absorb the deformation.

Thus, with such an installation, the fixed structure 201 is smaller but the deformations at the rear edge of the exterior wall 206b of the fan case 106 remain limited.

For preference, the distance "d1" between each shoe 404 and the corresponding spar 254 is comprised between 3 mm and 5 mm. Likewise, the distance "d2" between each shoe 404 and the upstream frame 250 is comprised between 0 and 3 mm.

In order to ensure better sealing in the forward position, the downstream frame 252 bears a seal 410, in this instance an o ring seal, on its exterior periphery, and the skirt 406 comes up against seal 410 in the forward position.

The invention has been more particularly described in the case of a nacelle under a wing, but can be applied to a nacelle situated at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbofan engine with a longitudinal axis and comprising:
   an engine, and
   a nacelle surrounding the engine,
      the nacelle comprising a fixed structure, a fan case and a thrust reversal system,
      the fan case comprising, fixed to the fixed structure, an interior wall with which the engine delimits a flow path for a bypass flow, and an exterior wall,
      the thrust reversal system comprising:
         a slider mounted with translational mobility on the fixed structure and having an upstream frame, a downstream frame and a plurality of spars parallel to the longitudinal axis, in which each spar is fixed by a first end to the upstream frame and by a second end to the downstream frame, and
         a mobile cowl fixed to and downstream of the downstream frame and having an interior wall which with the engine delimits the flow path, and an exterior wall, the slider being configured to move between a forward position, in which the slider is housed between the exterior wall of the fan case and the interior wall of the fan case and is positioned in such a way that the mobile cowl is up close to the fan case, and a retracted position in which the main slider is positioned in such a way that the mobile cowl is distanced from the fan case in order to define between them apertures that are open between the flow path and the outside of the nacelle, the fan case comprising, at a rear edge of its exterior wall, a support comprising, for each spar, a shoe fixed to the inside of the exterior wall facing the spar and positioned radially around the spar and, a skirt secured to the shoes and extending the rear edge of the exterior wall of the fan case, and wherein, in the forward position, the skirt bears around the downstream frame and the shoes are at a distance from these spars, in which in the retracted position, the shoes face and are distant from the upstream frame, and wherein, in an intermediate position between the forward position and the retracted position, the shoes face and are at some distance from the spars.

2. The bypass turbofan engine according to claim 1, wherein a distance between each shoe and a corresponding spar is comprised between 3 mm and 5 mm, and wherein a distance between each shoe and the upstream frame is comprised between 0 and 3 mm.

3. The bypass turbofan engine according to claim 1, wherein the downstream frame bears a seal on its exterior periphery, and wherein the skirt comes into contact with the seal in the forward position.

4. An aircraft comprising at least one bypass turbofan engine according to claim 1.

* * * * *